United States Patent
Safai

(10) Patent No.: US 11,232,539 B2
(45) Date of Patent: Jan. 25, 2022

(54) EXCITATION ARRAY MULTIPLEXING FOR ACTIVE NON-DESTRUCTIVE INSPECTION IMAGING SYSTEMS

(71) Applicant: The Boeing Company, Chicago, IL (US)

(72) Inventor: Morteza Safai, Newcastle, WA (US)

(73) Assignee: THE BOEING COMPANY, Chicago, IL (US)

(*) Notice: Subject to any disclaimer, the term of this patent is extended or adjusted under 35 U.S.C. 154(b) by 233 days.

(21) Appl. No.: 16/698,165

(22) Filed: Nov. 27, 2019

(65) Prior Publication Data
US 2021/0158480 A1  May 27, 2021

(51) Int. Cl.
| | |
|---|---|
| G06T 15/00 | (2011.01) |
| G06T 3/40 | (2006.01) |
| G06F 16/901 | (2019.01) |
| G06K 9/62 | (2006.01) |

(52) U.S. Cl.
CPC ........ *G06T 3/4023* (2013.01); *G06F 16/9017* (2019.01); *G06K 9/6202* (2013.01); *G06T 15/005* (2013.01)

(58) Field of Classification Search
CPC ... G06T 3/4023; G06T 15/005; G06T 1/0007; G06K 9/6202
See application file for complete search history.

(56) References Cited

U.S. PATENT DOCUMENTS

2016/0084761 A1* 3/2016 Rothberg ............. C12Q 1/6874
506/4

\* cited by examiner

*Primary Examiner* — Sam Bhattacharya
(74) *Attorney, Agent, or Firm* — Coats & Bennett, PLLC

(57) ABSTRACT

A method includes exciting, at a first time period, a first set of pixels in an excitation array, wherein the first set of pixels comprises more than one pixel, and no pixel in the first set of pixels is adjacent to another pixel in the first set of pixels. The method also includes exciting, at a second time period, a second set of pixels in the excitation array wherein the second set of pixels comprises more than one pixel, and no pixel in the second set of pixels is adjacent to another pixel in the second set of pixels. The method retrieves excitation data, wherein the excitation data is comprised of data from the first set of pixels and data from the second set of pixels, and the excitation data is capable of being combined to reconstruct an image of a target object for rendering on a display.

20 Claims, 8 Drawing Sheets

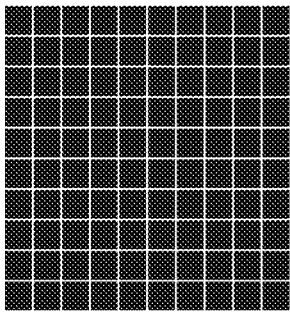
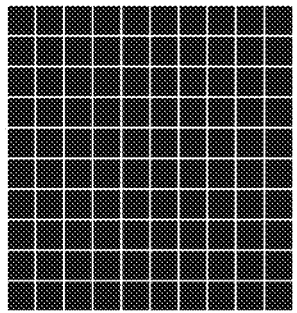
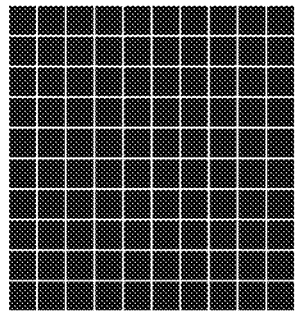
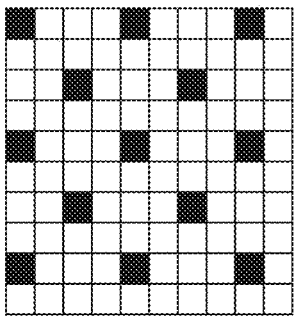
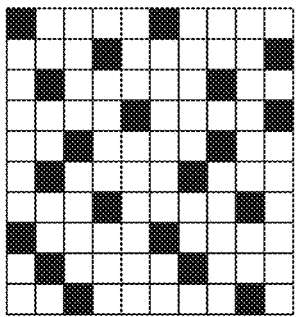
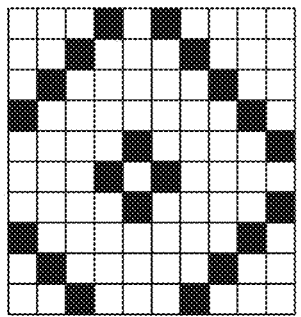
FIG. 3B
FIG. 3C
FIG. 3D
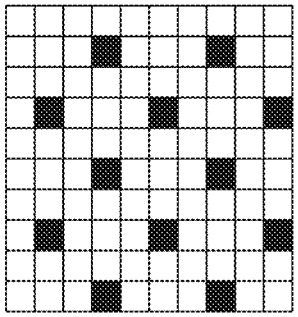
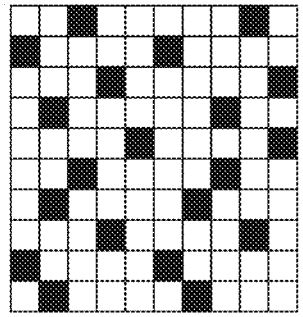
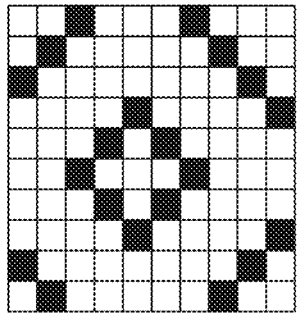
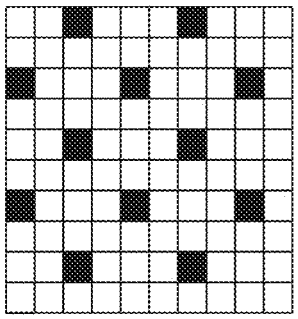
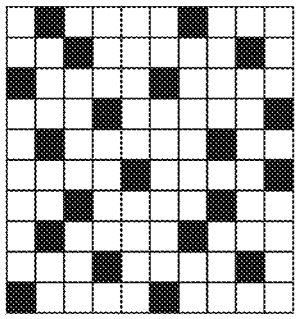
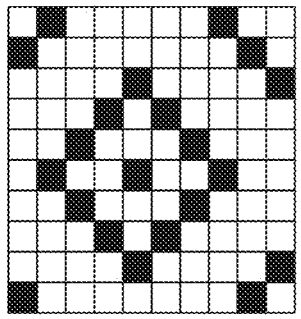

EXCITATION ARRAY MULTIPLEXING FOR ACTIVE NON-DESTRUCTIVE INSPECTION IMAGING SYSTEMS

TECHNOLOGICAL FIELD

The present disclosure relates generally to the field of active non-destructive inspection imaging systems. More specifically, the present disclosure relates to the field of excitation array multiplexing of active non-destructive inspection imaging systems.

BACKGROUND

Ultrasound scanning is often used for non-destructive inspection imaging. An ultrasound scanning apparatus can be comprised of a one-dimensional or two-dimensional array of transducers that image an object using ultrasound waves.

Current active excitation two-dimensional array imaging transducers excite all the excitation transducers in a coherent fashion, i.e., all the excitation transducers in the array are excited simultaneously. The signal received at individual transducers can interfere with adjacent transducers due to the phase shift generated from different distances the waves travel back to the detectors. This can create interference on at least some detectors and cause image blurring.

Such imaging provides low resolution imaging because of cross talk between individual detector arrays. The cross talk can become more apparent as the size of the detector numbers increases to reach a higher resolution in two-dimensional array transducers.

A plurality of transducers are in a phased array for use in active non-destructive imaging of objects. FIG. 1 is an illustration 100 of an image 102 rendered as a result of all pixels (T1-Tn) in a two-dimensional pixel array 104 being excited simultaneously. The image 102 is of objects $106_1$ and $106_2$. The two-dimensional pixel array 104 transmits acoustic waves towards the objects $106_1$ and $106_2$, which are reflected due to the objects $106_1$ and $106_2$ and the reflected waves are sensed by the pixel array 104 at the same time (or substantially the same time). In the image 102 produced, the objects $106_1$ and $106_2$ are blurred due to cross-talk between the individual transducers of the pixel array 104. The reflected signal received at individual transducers (e.g., R2 and R3) can interfere with adjacent transducers receiving other reflected signals, for example, due the phase shift generated from different distances the wave traveling back to the detectors. This creates a diffraction pattern interference, such as an Airy disk, on some detectors, which leads to image blurring, and a clear rendering of the objects $106_1$ and $106_2$ cannot be achieved.

SUMMARY

A method comprises exciting, at a first time period, a first set of pixels in a two-dimensional array, wherein the first set of pixels comprises more than one pixel, and no pixel in the first set of pixels is adjacent to another pixel in the first set of pixels. The method also comprises exciting, at a second time period, a second set of pixels in the two-dimensional array wherein the second set of pixels comprises more than one pixel, and no pixel in the second set of pixels is adjacent to another pixel in the second set of pixels. The method further comprises retrieving excitation data, wherein the excitation data is comprised of data from the first set of pixels and data from the second set of pixels, and the excitation data is capable of being combined to reconstruct an image target for rendering on a display.

A transceiver is operable to excite, at a first time period, a first set of pixels in a two-dimensional array, wherein the first set of pixels is in the two-dimensional array, and no pixel in the first set of pixels is adjacent to another pixel in the first set of pixels. The transceiver is also operable to excite, at a second time period, a second set of pixels in a two-dimensional array, wherein the second set of pixels is in the two-dimensional array, and no pixel in the second set of pixels is adjacent to another pixel in the second set of pixels. The transceiver is further operable to retrieve excitation data, wherein the excitation data is comprised of data from the first set of pixels and data from the second set of pixels, and the excitation data is capable of being combined to reconstruct an image target for rendering on a display.

A computer-readable storage medium being non-transitory and having computer-readable program code portions stored therein that in response to execution by a processor causes an apparatus to at least excite, at a first time period, a first set of pixels in a two-dimensional array, wherein the first set of pixels is in the two-dimensional array, and no pixel in the first set of pixels is adjacent to another pixel in the first set of pixels. The computer-readable storage medium also causes the apparatus to excite, at a second time period, a second set of pixels in a two-dimensional array, wherein the second set of pixels is in the two-dimensional array, and no pixel in the second set of pixels is adjacent to another pixel in the second set of pixels. The computer-readable storage medium further causes the apparatus to retrieve excitation data, wherein the excitation data is comprised of data from the first set of pixels and data from the second set of pixels, and the excitation data is capable of being combined to reconstruct an image target for rendering on a display.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
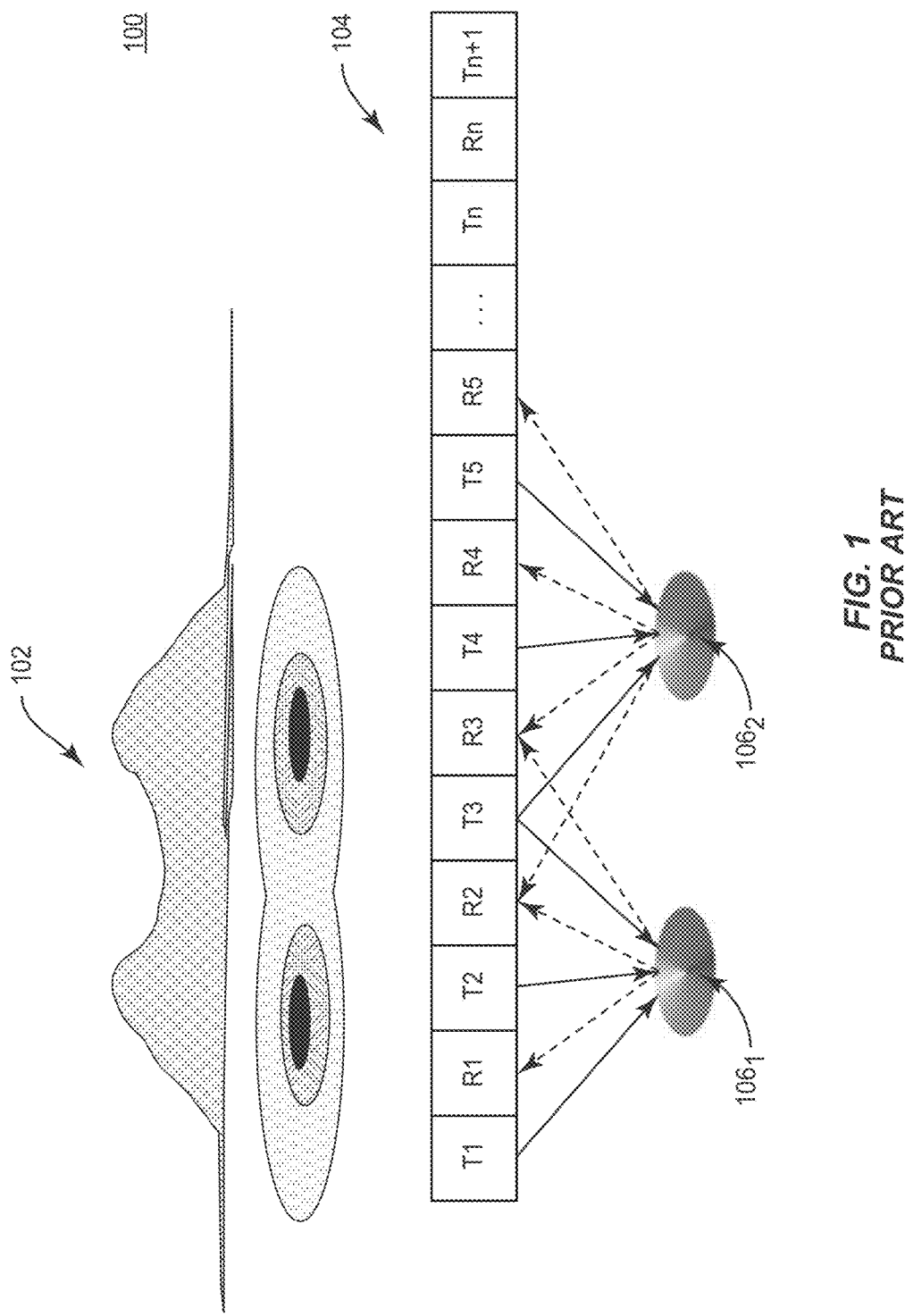

Having thus described variations of the disclosure in general terms, reference will now be made to the accompanying drawings, which are not necessarily drawn to scale, and wherein:

FIG. 1 is an illustration of an image rendered as a result of all pixels in a two-dimensional pixel array being excited simultaneously.

Figure 2:
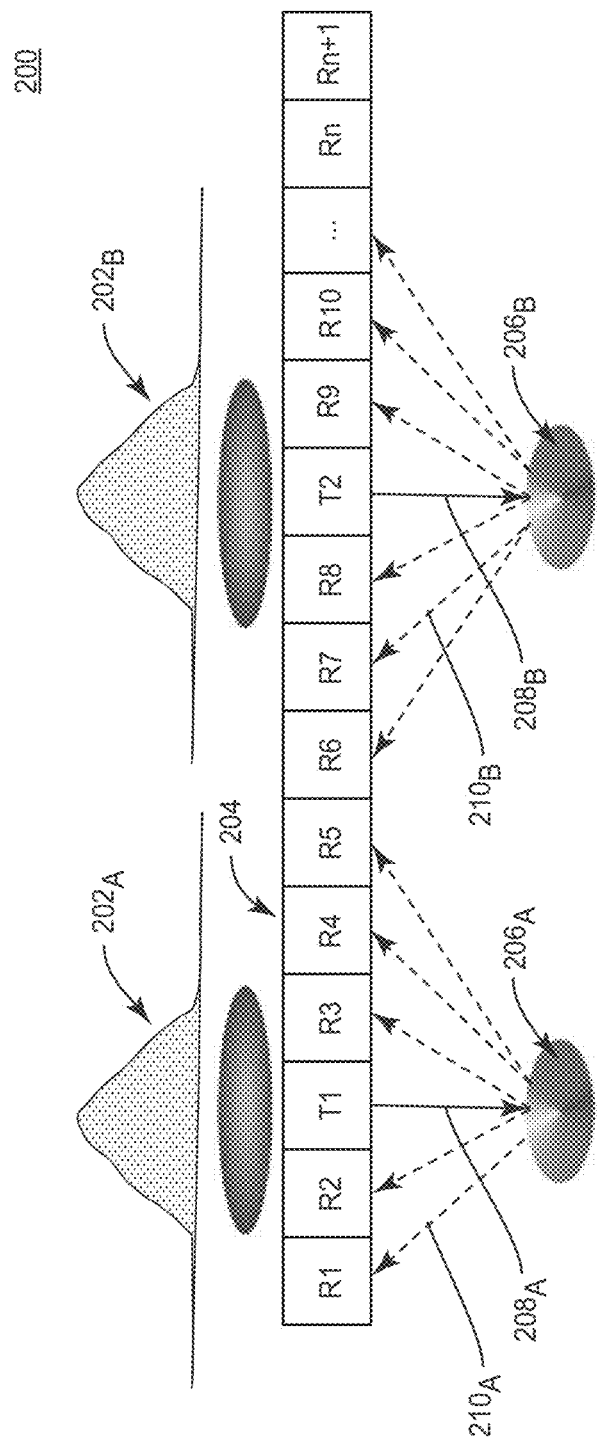

FIG. 2 is an embodiment that depicts an example imaging system that facilitates rendering of images from different sets of pixels in a pixel array that have been excited separately.

FIG. 3A-3D are example illustrations of different sequences for excitation of pixels in a pixel array.

Figure 4:
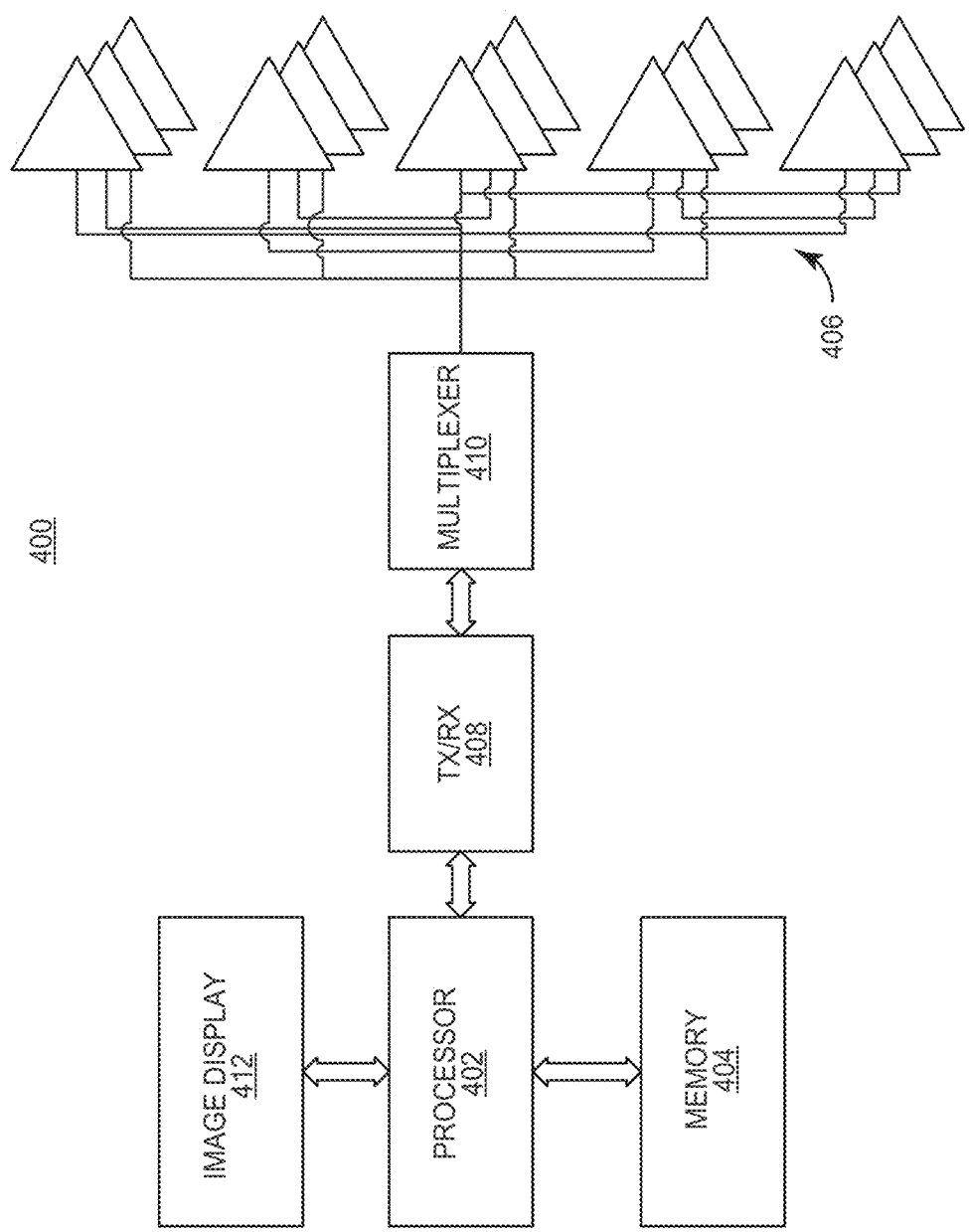

FIG. 4 is an illustration of a scanning apparatus according to one embodiment.

Figure 5:
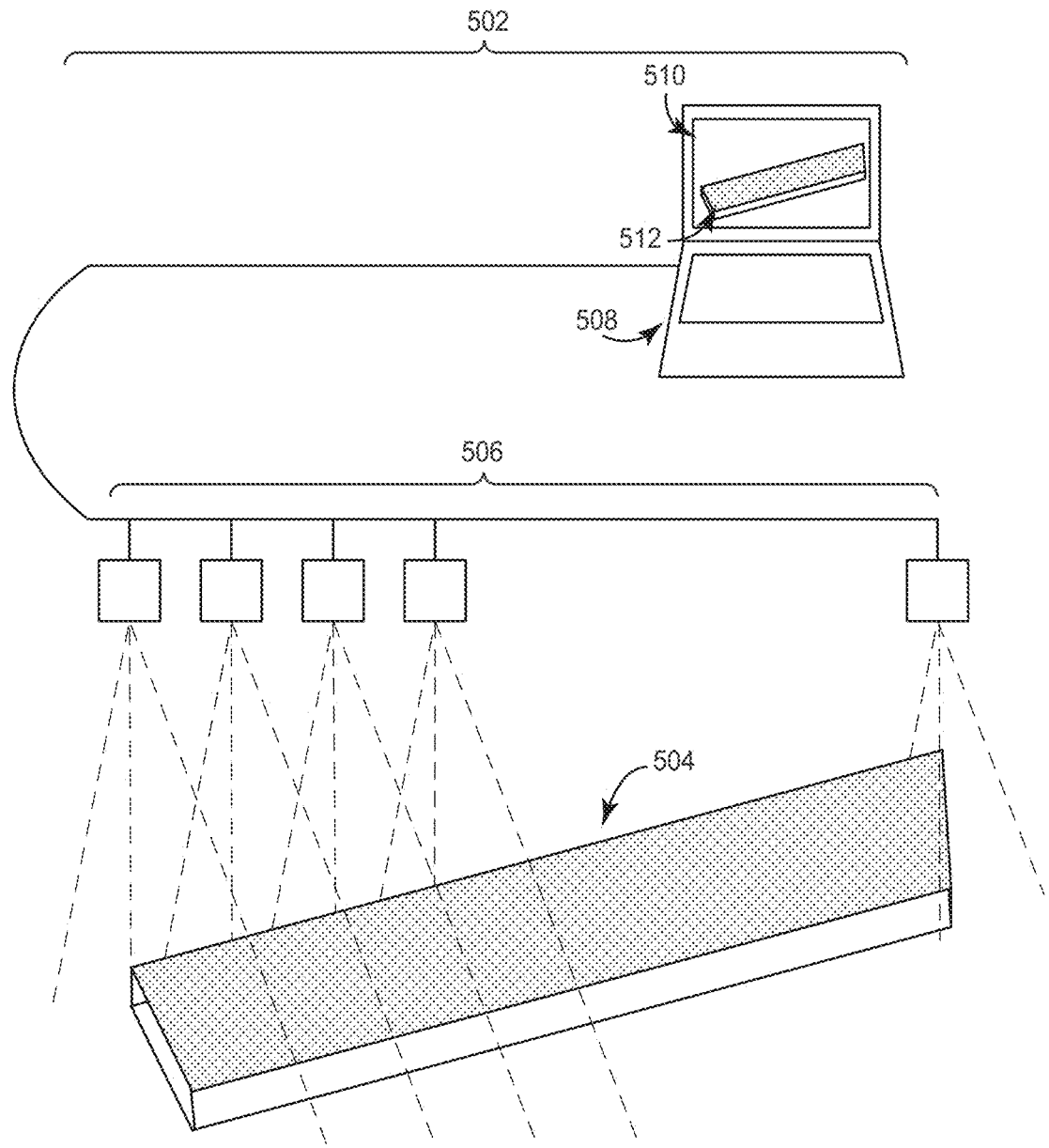

FIG. 5 is an illustration of an example imaging system for non-destructive inspection of an aircraft part.

Figure 6:
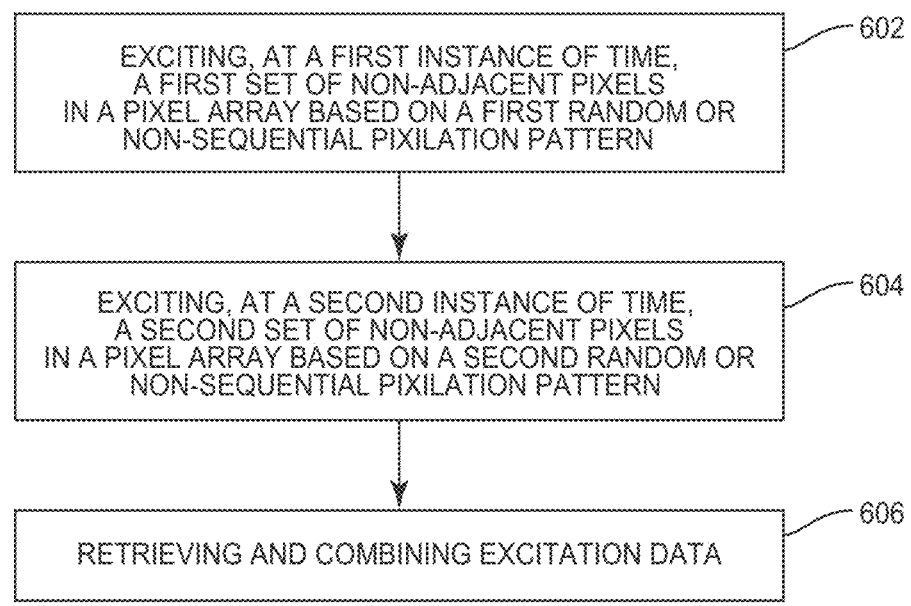

FIG. 6 is a flowchart that illustrates multiplexing data received in response to random or non-sequential pixilation excitation of an array according to one embodiment.

Figure 7:
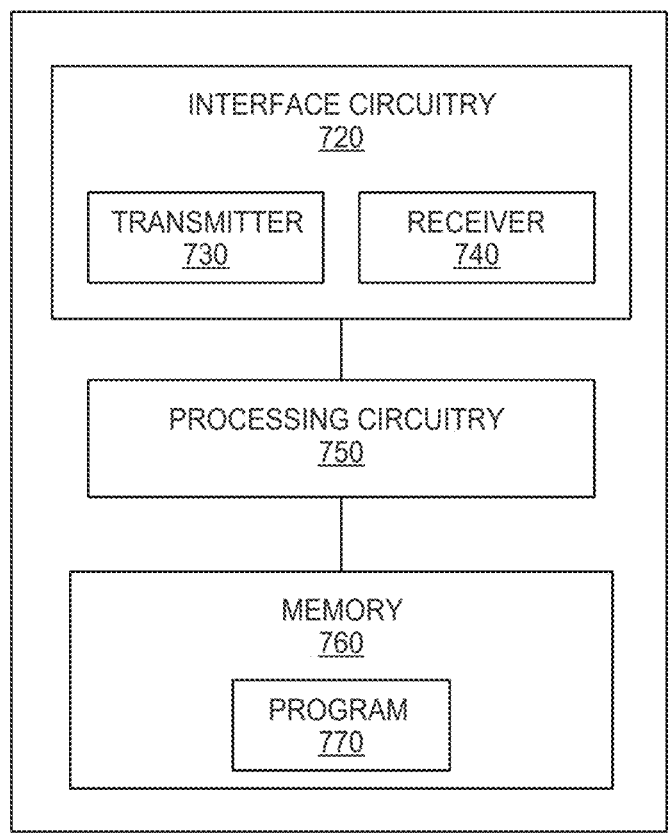

FIG. 7 illustrates an example apparatus 700 according to some example implementations of the present disclosure.

DETAILED DESCRIPTION

In the following description of the embodiments, reference is made to the accompanying drawings which form a part hereof, and in which is shown by way of illustration a specific embodiment in which the subject disclosure can be implemented. It is to be understood that other embodiments may be utilized and structural changes may be made without departing from the scope of the subject disclosure.

Within the specification, the terms excitation array, pixel array, and transducer array may be used to describe similar hardware performing the same functions of sending waves and receiving reflected waves in order to generate images using the resulting excitation data. Although an excitation array may have a 1:1 ratio for pixels to transducers, some embodiments may have multiple pixels per transducer or multiple transducers per pixel. In some embodiments, each pixel will have its own transducer. In some embodiments, a single pixel can have its own transducer or a transducer may provide data to multiple pixels. Throughout the specification, a 1:1 ratio is described, but it should be understood that this ratio is not required for embodiments to function. Some embodiments may have issues with image resolution quality when multiple pixels depend on the same transducer.

Further, throughout the specification, a two-dimensional array is discussed. However, in some embodiments, an excitation array can be a one-dimensional array such as the pixel array 204 or a three-dimensional excitation array (not shown). Moreover, multiple arrays can be used with the present disclosure.

FIG. 2 is an embodiment that depicts an example imaging system 200 that facilitates rendering of images $202_A$-$202_B$ from different sets of pixels (R=Receiver and T=Transmitter) in a pixel array 204 that have been excited separately. The images $202_A$-$202_B$ are of objects $206_A$ and $206_B$, respectively. In one aspect, different sets of pixels within the two-dimensional pixel array 204 are excited at different instances of time or during different time periods. Specifically, the pixels that are excited at the same time (e.g., within a set of pixels) are not adjacent (e.g., orthogonally adjacent, cardinally adjacent, edge adjacent) to each other.

In one embodiment, non-adjacent pixels T1 and T2 of the two-dimensional pixel array 204 transmit waves $208_A$ and $208_B$ to the objects $206_A$ and $206_B$, respectively at the same time (or substantially the same time). As a result of the waves $208_A$ and $208_B$ being reflected by the objects $206_A$ and $206_B$, respectively reflected waves $210_A$ and $210_B$ can be received by receivers (R1-R10) of the two-dimensional pixel array 204. Since transmitters T1 and T2 are separated by one or more pixels (that are used for reflected wave reception), the aperture of the system 200 can be more focused and accordingly, crosstalk and/or other interference can be significantly reduced.

In another embodiment, the pixels T1 and T2 of the two-dimensional pixel array 204 transmit waves $208_A$ and $208_B$ to the objects $206_A$ and $206_B$, respectively at different instances in time. In this case, since waves $208_A$ and $208_B$ are sent at a different times, reflected waves $210_A$ and $210_B$ are received at different times and accordingly, crosstalk and/or other interference can be further reduced. This approach reduces noise shown in image 102 from FIG. 1 because data received by a transducer in system 200 is not corrupted by data intended for an adjacent transducer, such as in the case of cross-talk that can occur if every pixel is excited at the same time. As shown, the images $202_A$ and $202_B$ are is clearer and have a higher resolution than the image 102 in FIG. 1, showing a gradient-like appearance similar to that of the objects $206_A$ and $206_B$ rather than only three shades of color. Moreover, system 200 eliminates interference between two nearby transmitting transducers, where the wave from each transducers would otherwise create constructive and destructive interference, which can affect the focus of the system (e.g., similar to a light with multiple slits in front of it, where an interference ring accrues as the result).

Figure 3A:
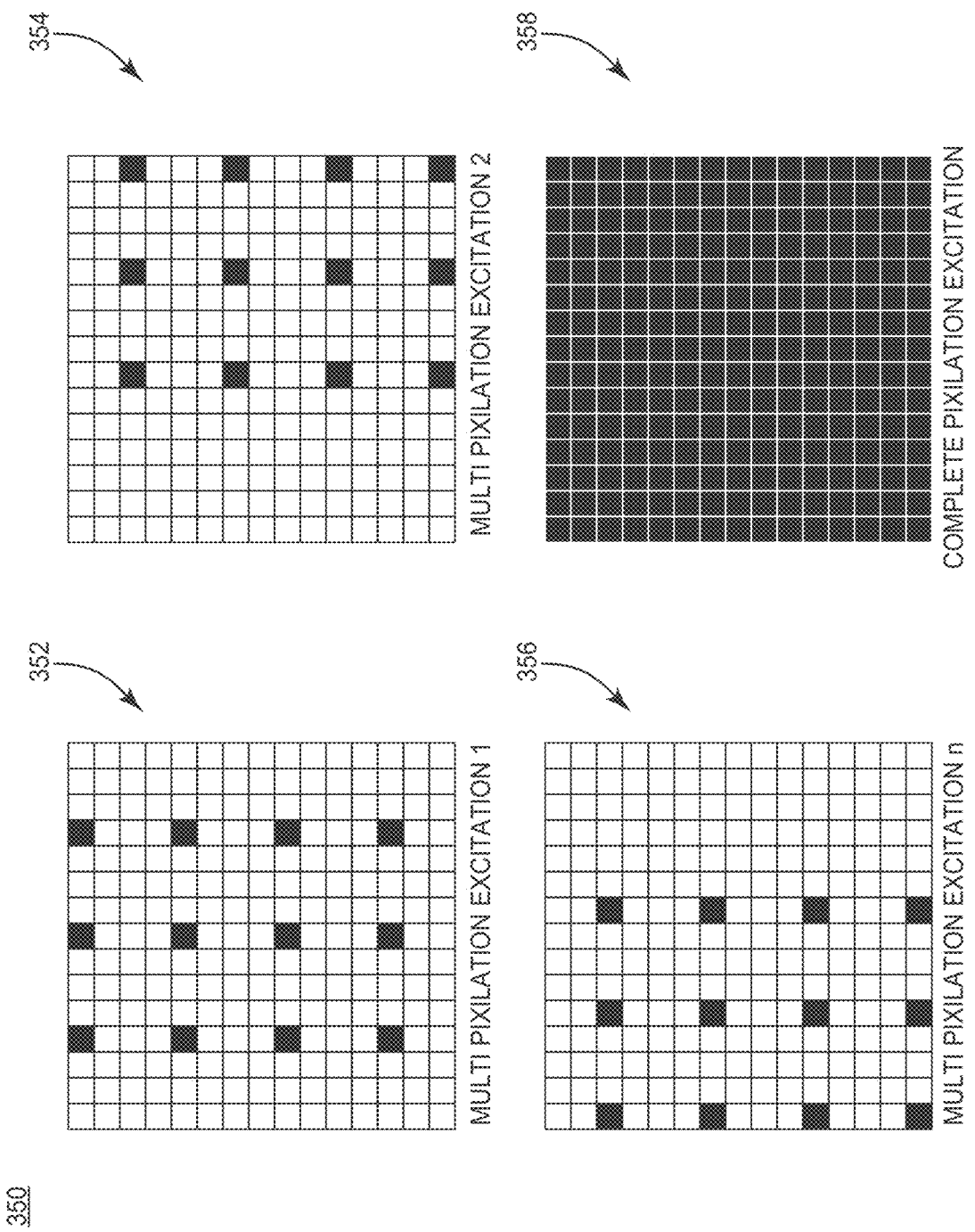

FIG. 3A is an illustration 350 of a sequence of excitation of pixels in an array (e.g., two-dimensional pixel array 204) according to one embodiment. Pixels that are excited are depicted in a solid color. At a time t1, a first set of pixels 352 (e.g., including twelve pixels depicted in solid color) are excited in a transducer array. In one aspect, as part of the excitation, the pixels transmit a signal towards a target object and receive signals generated due to the reflection of the signal off the target object. At a time t2 that follows time t1, a second set of pixels 354 are excited. The second set comprises the same number of pixels as in the first set that are separated by the same number of pixels as in the first set. At time t3 that follows time t2, a third set of pixels 356, also the same number and having the same distance between the pixels, are excited. In pixel sets 352, 354, and 356, none of the pixels that are excited are excited in more than one time frame. The process of exciting different sets of pixels at different times can be repeated until all pixels in the array have been excited (as shown at 358) and data has been received to be used in multiplexing and determining information such as, but not limited to, a shape, material characteristics, material density, boundary layers, and/or polarity of materials associated with the target object. In the embodiment of FIG. 3A, the highlighted pixels in each pixel set 352, 354, and 356 are equidistant. Once all the pixels have been excited, as shown in the complete set of pixels 358, the data from the excitation can be collected and multiplexed in order to provide a clear image of the object being scanned. It is noted that all pixels are to be excited to generate a full field view, but the subject disclosure is not limited to exciting all pixels and fewer than all pixels can be excited to generate a partial or more focused view.

FIGS. 3B-3D are illustrations of further embodiments of sequences of excitations of pixels in an array (e.g., two-dimensional pixel array 204). The pixel sets 302-306, 322-326, 342-346 depict predetermined arrangements of pixels that are excited at different instances in time.

In FIG. 3B, the example arrangement is a pattern where all excited pixels are at least three pixels apart from each other in the horizontal and vertical directions in each time. Like, FIG. 3A, all the pixels are equidistant. Pixel set 302 shows a first pattern of highlighted pixels that are excited at a first time. Pixel set 304 replicates the first pattern, shifting the first pattern one pixel horizontally and one pixel vertically. Pixel set 306 shows a shift of highlighted pixels in the same horizontal direction, but in the opposite vertical direction. The highlighted pixels in set 304 are excited at a second time and the highlighted pixels in set 306 are excited at a third time. This process can be repeated until all pixels have been excited (as shown at 308) and have received data that is to be used in multiplexing and determining the object characteristics (e.g., shape, size, composition, etc.).

In FIG. 3C, the example arrangement of highlighted pixels that are to be excited at a first time can be random in pixel set 322, but no two pixels are adjacent (e.g., orthogonally adjacent, cardinally adjacent, edge adjacent). The arrangement is repeated with one pixel shift in the horizontal direction for every pixel in pixel set 324 (at a second time) and then again in pixel set 326 (at a third time) so that the pixels are adjacent from one time to the next. In this example arrangement, some pixels may be excited more than one time. In some embodiments, this additional excitation of the same pixel can be accounted for in calculations. For example, the excitation results can be used in an averaging calculation to provide data that denotes a single result. In some embodiments, the additional data from the same pixel can be used without mitigation. The process for exciting different sets of pixels at different times can be repeated until all pixels have been excited (as shown at 328) and have received data to be used in multiplexing and determining the object characteristics (e.g., shape, size, composition, etc.).

In FIG. 3D, another example arrangement of highlighted pixels is illustrated. Pixel set 342 shows a concentric diamond pattern of highlighted pixels that are excited at a first time. Each highlighted pixel is at least two pixels away horizontally and vertically from other highlighted pixels. Each highlighted pixel can be diagonally situated next to another highlighted pixel. Pixel set 344 depicts another example pattern shown with two concentric diamonds, wherein each highlighted pixel is one off from the pattern depicted in pixel set 342. Pixel set 346 has the same pattern and same offset from pixel set 344 as pixel set 344 has from pixel set 342. The highlighted pixels in pixel set 344 are excited at a second time, and the highlighted pixels in pixel set 346 are excited at a third time. The patterns and excitation process can be repeated until all pixels have been excited (as shown at 348) and have received data to be used in multiplexing and determining the object characteristics (e.g., shape, size, composition, etc.).

Various other combinations, patterns, and arrangements can be utilized for pixel excitation beyond the examples provided in FIGS. 3A-3D, and the description above in combination with the figures themselves is in no way intended to limit the scope of the disclosure. In an embodiment, the arrangement can be selected based on various parameters, such as, but not limited to, an orientation of a defect within a part that is to be inspected or a particular area in the image for a higher degree of accuracy.

FIG. 4 is an illustration of a scanning apparatus 400 according to one embodiment. The scanning apparatus 400 includes a processor 402 and a memory 404 with a two-dimensional transducer array 406. The two-dimensional transducer array 406 can be substantially similar to the pixel array 204 and can comprise functionality described in detail herein with respect to pixel array 204. A transceiver 408 sends and receives signals from the two-dimensional transducer array 406. The two-dimensional transducer array 406 is connected to a multiplexer 410 that receives the reflected waves (e.g., reflected from a target object) from the transducers in the two-dimensional transducer array 406. Further, the multiplexer 410 can combine (e.g., multiplex) received data, which can then be utilized by the processor 402 to generate information (e.g., an image of the target object) that can be presented via an image display 412. Additionally or optionally, processor 402 can perform additional signal processing to improve image quality of the image. In some embodiments, the image display 412 can be part of the scanning apparatus 400 as shown. In some embodiments, the image display 412 can be remotely coupled to the processor 402. In some embodiments, the processor 402 and the multiplexer 410 can be the same component.

Each pixel in the two-dimensional transducer array 406 can be excited individually by the transceiver 408. As shown in FIGS. 3A-3D, the pixels can be excited in a predetermined arrangement, for example, defined by and/or triggered by processor 402. The predetermined arrangement can be based on a number of pixels between each pixel in the set of excited pixels for a particular time. In some embodiments, the predetermined arrangement can be determined by the desired image resolution, a signal frequency of a signal transmitted by the pixels, an aperture of the scanning apparatus 400, an orientation of a defect on the object, operator input, and/or other imaging constrictions. In some embodiments, the number of pixels to be excited at specific times can be determined based on a lookup data structure, such as a lookup table, that can be stored in memory 404. In contrast with conventional systems that utilize sequential proximal excitation, the scanning apparatus 400 facilitates random and/or non-sequential pixilation excitation that reduces return signal cross talk and improves image resolution.

In some embodiments, scanning apparatus 400 can be utilized for non-destructive inspection, for example, non-destructive inspection of aircraft parts. As an example, the two-dimensional transducer array 406 can use ultrasonic waves, eddy current waves, radio waves, holographic waves, infrared waves, acoustic waves, and/or x-ray waves. Other exemplary application of the scanning apparatus 400 include uses in radar systems for guidance and navigation, infrared systems for search and rescue, and eddy current testing, ultrasonic, and x-ray systems for equipment diagnostics and/or other applications in manufacturing, medical fields, meteorology, construction, and more.

FIG. 5 is an illustration 500 of an example imaging system 502 for non-destructive inspection of an aircraft part 504. The imaging system 502 can be similar to the scanning apparatus 400 of FIG. 4. As shown, the transducer array 406 of FIG. 4 is represented in FIG. 5 as a transducer array 506 that is used to image the aircraft part 504. In FIG. 5, the imaging system 502 includes a computing device 508 (e.g., a laptop) with an integrated monitor 510 that displays an image 512 of the aircraft part 504. In some embodiments, the monitor and/or other display device can be remotely coupled to the computing device 508.

In some embodiments, the imaging system 502 can scan the aircraft part 504 for diagnostic purposes, inspection purposes, and the like. The interior and exterior of the aircraft part 504 can be examined using the imaging system 502. Further, the system 502 can detect defects, such as, surface defects (e.g., cracks) and/or subsurface defects (e.g., delamination and disbonds). The computing device 508 can be a generic computer or a specialty hardware apparatus to perform the collection of data, the multiplexing of that data, and the output of the image based at least in part on the multiplexed data.

In some embodiments, the imaging system 502 can include at least another hardware component to communicate between the computing device 508 and the transducer array 506. For example, another hardware component can provide the portions of scanning apparatus 400 of FIG. 4, such as the processor 402, the memory 404, the transceiver 408, and the multiplexer 410. In some embodiments, the computing device 508 and the transducer array 506 are connected wirelessly. In some embodiments, the transducer array 506 and the computing device 508 have a hardwired connection.

FIG. 6 is a flowchart that illustrates multiplexing data received in response to random or non-sequential pixilation excitation of an array according to one embodiment. In FIG. 6, a method 600 comprises at 602, exciting, at a first instance of time, a first set of non-adjacent pixels in a pixel array that is selected based on a first random or non-sequential pixilation pattern. According to an embodiment, the first set of pixels includes more than one pixel and no pixel in the first set of pixels is adjacent to another pixel in the first set of pixels. For example, as shown in FIG. 3A, the set of pixels 352 can be in a predetermined arrangement based on the number of pixels between each pixel in the first set of pixels 352. As part of the excitation, the first set of pixels transmit a first signal that is reflected off a target object and receive a first reflected signal.

The method 600 further includes at 604, exciting, at a second instance of time, a second set of non-adjacent pixels in the pixel array that is selected based on a second random or non-sequential pixilation pattern. According to an embodiment, the second set of pixels includes more than one pixel and no pixel in the second set of pixels is adjacent to another pixel in the second set of pixels. For example, as shown in FIG. 3A, the second set of pixels 354 are each four pixels apart. As part of the excitation, the second set of pixels transmit a second signal that is reflected off the target object and receive a second reflected signal. The method 600 further includes retrieving excitation data at 606, wherein the excitation data is comprised of data associated with the first reflected signal received from the first set of pixels and data associated with the second reflected signal received from the second set of pixels. According to an aspect, the excitation data can be being combined, for example, using a multiplexing technique to generate information (e.g., object image) for rendering on a display. The multiplexing can avoid distortion that is typically caused by Nyquist frequency. In some embodiments, the excitation data is combined only when all the excitation data is received (e.g., to determine a full field view). In some embodiments, the excitation array excites all the pixels prior to combining the excitation data. The resulting object image has a higher resolution and/or better clarity in such instances.

In an aspect, the image data can be employed in non-destructive inspection imaging, for example, to detect defects (e.g., cracks) in manufactured parts. In some embodiments, the first set of pixels can be selected in a defined arrangement. For example, the defined arrangement can be based on a number of pixels between each pixel in the first set of pixels. The number of pixels can be based on a parameter such as image resolution, signal frequency, and/or aperture. For example, if a user wishes to achieve a higher image resolution, the number of pixels between each excited pixel in a set of pixels can be increased in order to ensure the image has a higher resolution.

In some embodiments, the method 600 can allow for the first set of pixels to share at least one pixel with the second set of pixels.

The method illustrated generally in FIG. 6 is non-limiting and can be implemented by at least a portion of the apparatuses and systems presented in at least one of FIGS. 2-5 and 7.

FIG. 7 illustrates an apparatus 700 according to some example implementations of the present disclosure. The apparatuses and systems presented in at least one of FIGS. 2-5 can comprise at least a portion of apparatus 700. Further, method 600 can be performed by at least a portion of apparatus 700. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 750 (e.g., processor unit) connected to a memory 760 (e.g., storage device).

The processing circuitry 750 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 760 (of the same or another apparatus).

The processing circuitry 750 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 760 is generally any piece of computer hardware that is capable of storing information such as, for example, data, computer programs (e.g., computer-readable program code 770) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 760, the processing circuitry 750 may also be connected to one or more interfaces for displaying, transmitting and/or receiving information. The interfaces may include a communications interface 720. The communications interface 720 may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like. The communications interface may have one or more transmitters 730. The communications interface may have one or more receivers 740.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 700 may include a processing circuitry 750 and a computer-readable storage medium or memory 760 coupled to the processing circuitry, where the processing circuitry is configured to execute computer-readable program code 770 stored in the memory. It will also be understood that one or more functions, and combinations of functions, may be implemented by special purpose hardware-based computer systems and/or processing circuitry s which perform the specified functions, or combinations of special purpose hardware and program code instructions.

Further, the disclosure comprises embodiments according to the following clauses:

Clause 1. A method, comprising:
 exciting, at a first time period, a first set of pixels in an excitation array, wherein:
  the first set of pixels includes more than one pixel, and
  no pixel in the first set of pixels is adjacent to another pixel in the first set of pixels;
 exciting, at a second time period, a second set of pixels in the excitation array wherein:
  the second set of pixels includes more than one pixel, and
  no pixel in the second set of pixels is adjacent to another pixel in the second set of pixels; and
 retrieving excitation data, wherein:
  the excitation data includes data from the first set of pixels and data from the second set of pixels, and
  the excitation data is capable of being combined to reconstruct an image for rendering on a display.

Clause 2. The method of Clause 1, further including setting a predetermined arrangement for the first set of pixels.

Clause 3. The method of Clause 2, wherein setting a predetermined arrangement is based on a number of pixels between each pixel in the first set of pixels.

Clause 4. The method of Clause 3, wherein the number of pixels is determined based on at least one of a resolution of the image, a signal frequency of a signal transmitted by the first set of pixels, or an aperture of the excitation array.

Clause 5. The method of Clause 3, wherein the number of pixels is determined using a lookup data structure stored in memory.

Clause 6. The method of any of Clauses 1 to 5, wherein the first set of pixels and the second set of pixels do not share any pixels.

Clause 7. The method of any of Clauses 1 to 5, wherein at least one pixel in the first set of pixels is adjacent to at least one pixel in the second set of pixels.

Clause 8. The method of any of Clauses 1 to 7, further including:
 exciting, at a third time period, a third set of pixels in the excitation array, wherein:
  the third set of pixels includes more than one pixel, and
  no pixel in the third set of pixels is adjacent to another pixel in the third set of pixels.

Clause 9. The method of Clause 8, wherein the excitation data further includes data from the third set of pixels.

Clause 10. A transceiver, the transceiver operable to:
 excite, during a first interval, a first set of pixels in an excitation array, wherein:
  the first set of pixels is in the excitation array, and
  no pixel in the first set of pixels is adjacent to another pixel in the first set of pixels,
 excite, during a second interval, a second set of pixels in the excitation array, wherein:
  the second set of pixels is in the excitation array, and
  no pixel in the second set of pixels is adjacent to another pixel in the second set of pixels, and
 retrieve excitation data, wherein:
  the excitation data includes data from the first set of pixels and data from the second set of pixels, and
  the excitation data is capable of being combined to reconstruct an image for rendering on a display.

Clause 11. The transceiver of Clause 10, wherein the transceiver is further operable to determine a pattern for the first set of pixels.

Clause 12. The transceiver of Clause 11, wherein the pattern is determined based on a number of pixels between each pixel in the first set of pixels.

Clause 13. The transceiver of Clause 12, wherein the number of pixels is defined based on at least one of an image resolution of the image, a signal frequency of a signal that is to be transmitted by the first set of pixels, or an aperture of the transceiver.

Clause 14. The transceiver of Clause 12, wherein the number of pixels is determined using a lookup data structure stored in memory.

Clause 15. The transceiver of any of Clauses 10-14, wherein the first set of pixels and the second set of pixels do not share any pixels.

Clause 16. The transceiver of any of Clauses 10-15, wherein the transceiver is further operable to:
 excite, during a third interval, a third set of pixels in the excitation array, wherein:
  the third set of pixels is in the excitation array, and
  no pixel in the third set of pixels is adjacent to another pixel in the third set of pixels.

Clause 17. The transceiver of Clause 16, wherein the excitation data further includes data from the third set of pixels.

Clause 18. The transceiver of any of Clauses 10-17, wherein the excitation data is combined using a multiplexing technique.

Clause 19. The transceiver of any of Clauses 10-18, wherein excitation uses ultrasound technology.

Clause 20. A non-transitory computer-readable storage medium, the computer-readable storage medium being non-transitory and having computer-readable program code portions stored therein that in response to execution by a processor, cause an apparatus to at least:
instruct a first set of pixels in a excitation array to transmit, during a first time period, first signals, wherein:
the first set of pixels is in the excitation array, and
no pixel in the first set of pixels is adjacent to another pixel in the first set of pixels,
instruct a second set of pixels in the excitation array to transmit, during a second time period, second signals, wherein:
the second set of pixels is in the excitation array, and
no pixel in the second set of pixels is adjacent to another pixel in the second set of pixels, and
receive excitation data, wherein:
the excitation data includes first data from the first set of pixels and second data from the second set of pixels, wherein the first data that has been received due to a first reflection of the first signal from a target object and the second data that has been received due to a second reflection of the second signal from the target object, and
the excitation data is capable of being combined to reconstruct an image of the target object. Terms such as "includes" or "contains," are to be interpreted to be inclusive in a manner similar to the term "comprises" as an open transition word without precluding any additional or other elements.

The subject disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

The subject disclosure may be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method, comprising:
exciting, at a first time period, a first set of pixels in an excitation array, wherein:
the first set of pixels comprises more than one pixel, and
no pixel in the first set of pixels is adjacent to another pixel in the first set of pixels;
exciting, at a second time period, a second set of pixels in the excitation array wherein:
the second set of pixels comprises more than one pixel, and
no pixel in the second set of pixels is adjacent to another pixel in the second set of pixels; and
retrieving excitation data, wherein:
the excitation data is comprised of data from the first set of pixels and data from the second set of pixels, and
the excitation data is capable of being combined to reconstruct an image for rendering on a display.

2. The method of claim 1, further comprising setting a predetermined arrangement for the first set of pixels.

3. The method of claim 2, wherein setting a predetermined arrangement is based on a number of pixels between each pixel in the first set of pixels.

4. The method of claim 3, wherein the number of pixels is determined based on at least one of a resolution of the image, a signal frequency of a signal transmitted by the first set of pixels, or an aperture of the excitation array.

5. The method of claim 3, wherein the number of pixels is determined using a lookup data structure stored in memory.

6. The method of claim 1, wherein the first set of pixels and the second set of pixels do not share any pixels.

7. The method of claim 1, wherein at least one pixel in the first set of pixels is adjacent to at least one pixel in the second set of pixels.

8. The method of claim 1, further comprising:
exciting, at a third time period, a third set of pixels in the excitation array, wherein:
the third set of pixels comprises of more than one pixel, and
no pixel in the third set of pixels is adjacent to another pixel in the third set of pixels.

9. The method of claim 8, wherein the excitation data is further comprised of data from the third set of pixels.

10. A transceiver, the transceiver operable to:
excite, during a first interval, a first set of pixels in an excitation array, wherein:
the first set of pixels is in the excitation array, and
no pixel in the first set of pixels is adjacent to another pixel in the first set of pixels,
excite, during a second interval, a second set of pixels in the excitation array, wherein:
the second set of pixels is in the excitation array, and
no pixel in the second set of pixels is adjacent to another pixel in the second set of pixels, and
retrieve excitation data, wherein:
the excitation data is comprised of data from the first set of pixels and data from the second set of pixels, and
the excitation data is capable of being combined to reconstruct an image for rendering on a display.

11. The transceiver of claim 10, wherein the transceiver is further operable to determine a pattern for the first set of pixels.

12. The transceiver of claim 11, wherein the pattern is determined based on a number of pixels between each pixel in the first set of pixels.

13. The transceiver of claim 12, wherein the number of pixels is defined based on at least one of an image resolution of the image, a signal frequency of a signal that is to be transmitted by the first set of pixels, or an aperture of the transceiver.

14. The transceiver of claim 12, wherein the number of pixels is determined using a lookup data structure stored in memory.

15. The transceiver of claim 10, wherein the first set of pixels and the second set of pixels do not share any pixels.

16. The transceiver of claim 10, wherein the excitation data is combined using a multiplexing technique.

17. The transceiver of claim 10, wherein the transceiver is further operable to:

excite, during a third interval, a third set of pixels in the excitation array, wherein:
- the third set of pixels is in the excitation array, and
- no pixel in the third set of pixels is adjacent to another pixel in the third set of pixels.

18. The transceiver of claim 17, wherein the excitation data is further comprised of data from the third set of pixels.

19. The transceiver of claim 10, wherein excitation uses ultrasound technology.

20. A non-transitory computer-readable storage medium, the computer-readable storage medium being non-transitory and having computer-readable program code portions stored therein that in response to execution by a processor, cause an apparatus to at least:
- instruct a first set of pixels in a excitation array to transmit, during a first time period, first signals, wherein:
  - the first set of pixels is in the excitation array, and
  - no pixel in the first set of pixels is adjacent to another pixel in the first set of pixels,
- instruct a second set of pixels in the excitation array to transmit, during a second time period, second signals, wherein:
  - the second set of pixels is in the excitation array, and
  - no pixel in the second set of pixels is adjacent to another pixel in the second set of pixels, and
- receive excitation data, wherein:
  - the excitation data is comprised of first data from the first set of pixels and second data from the second set of pixels, wherein the first data that has been received due to a first reflection of the first signal from a target object and the second data that has been received due to a second reflection of the second signal from the target object, and
  - the excitation data is capable of being combined to reconstruct an image of the target object.

* * * * *